United States Patent
Schade et al.

(10) Patent No.: US 10,969,541 B2
(45) Date of Patent: Apr. 6, 2021

(54) METHOD FOR DETERMINING THE CURVATURE AND/OR TORSION OF AN OPTICAL WAVEGUIDE

(71) Applicants: Fraunhofer-Gesellschaft zur Förderung der angewandten Forschung e.V., Munich (DE); Photonik Inkubator GmbH, Göttingen (DE)

(72) Inventors: Wolfgang Schade, Goslar (DE); Martin Angelmahr, Hemsbach (DE); Christian Waltermann, Goslar (DE)

(73) Assignees: Fraunhofer-Gesellschaft zur Förderung der angewandten Forschung e.V., Munich (DE); Photonik Inkubator GmbH, Göttingen (DE)

( * ) Notice: Subject to any disclaimer, the term of this patent is extended or adjusted under 35 U.S.C. 154(b) by 93 days.

(21) Appl. No.: 16/320,636

(22) PCT Filed: Aug. 8, 2017

(86) PCT No.: PCT/EP2017/070006
§ 371 (c)(1),
(2) Date: Jan. 25, 2019

(87) PCT Pub. No.: WO2018/029165
PCT Pub. Date: Feb. 15, 2018

(65) Prior Publication Data
US 2019/0170930 A1   Jun. 6, 2019

(30) Foreign Application Priority Data

Aug. 10, 2016 (DE) .................... 10 2016 214 887.7

(51) Int. Cl.
*G02B 6/02* (2006.01)
*G01D 5/353* (2006.01)

(52) U.S. Cl.
CPC ......... *G02B 6/0208* (2013.01); *G01D 5/3538* (2013.01); *G01D 5/35316* (2013.01); *G02B 6/021* (2013.01)

(58) Field of Classification Search
CPC .. G02B 6/0208; G02B 6/021; G01D 5/35316; G01D 5/3538
See application file for complete search history.

(56) References Cited

U.S. PATENT DOCUMENTS 9,081,165 B2 * 7/2015 Swinehart .......... G02B 6/02209
2006/0093012 A1 5/2006 Singh et al.
(Continued)

FOREIGN PATENT DOCUMENTS

DE  10 2005 030 753 A1  1/2007
DE  10 2014 211 918 A1  12/2015
(Continued)

OTHER PUBLICATIONS

International Search Report, issued in International Application No. PCT/EP2017/070006, dated Nov. 9, 2017, pp. 1-3, European Patent Office, Rijswijk, Netherlands.

*Primary Examiner* — Tony Ko
(74) *Attorney, Agent, or Firm* — Brinks Gilson & Lione

(57) ABSTRACT

A method for determining a curvature and/or torsion of an optical waveguide of a fibre-optic sensor, comprising at least two Bragg gratings introduced into the optical waveguide and extending through a common cross-sectional plane, situated in a radial direction, through the optical waveguide, wherein the Bragg gratings are introduced in the core and/or on the boundary between the core and the cladding and/or in an inner edge region of the cladding within an evanescence region of the light, the method comprising: providing ref-
(Continued)

erence data of intensities of reflected light portions of light coupled into the optical waveguide, in particular depending on known reference deformations of the optical waveguide, measuring at least one light intensity of reflected light portions of light coupled into the optical waveguide, wherein the optical waveguide has a deformation to be determined, and determining the deformation by comparing the light intensity with the reference data.

13 Claims, 2 Drawing Sheets

(56) References Cited

U.S. PATENT DOCUMENTS

| | | |
|---|---|---|
| 2006/0215976 A1 | 9/2006 | Singh et al. |
| 2007/0230861 A1 | 10/2007 | Khrushchev et al. |
| 2010/0166358 A1* | 7/2010 | Homa .............. B29D 11/00721 385/12 |

FOREIGN PATENT DOCUMENTS

| | | |
|---|---|---|
| JP | H11218450 A | 8/1999 |
| WO | WO 2014/026839 A2 | 2/2014 |

\* cited by examiner

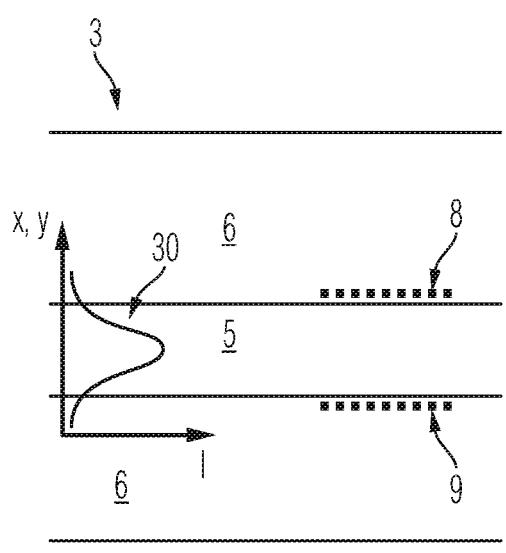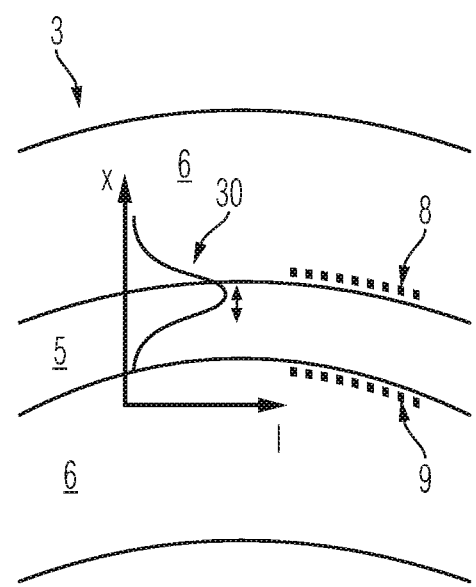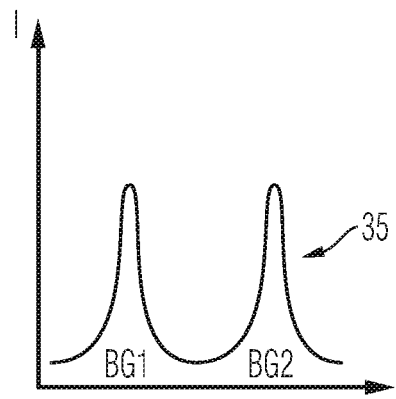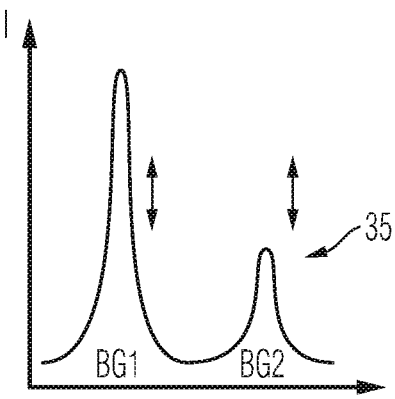
Fig. 3a　　　　　　　　Fig. 3b

METHOD FOR DETERMINING THE CURVATURE AND/OR TORSION OF AN OPTICAL WAVEGUIDE

CROSS-REFERENCE TO RELATED APPLICATIONS

This application is a 371 nationalization of international patent application PCT/EP2017/070006 filed Aug. 8, 2017, which claims priority under 35 USC § 119 to German patent application 10 2016 214 887.7 filed Aug. 10, 2016. The entire contents of each of the above-identified applications are hereby incorporated by reference.

TECHNICAL FIELD

The invention relates to a method for determining the curvature and/or torsion of an optical waveguide of a fiber-optic sensor.

BRIEF DESCRIPTION OF THE DRAWINGS

FIGS. 3a and 3b show a diagram of the principle underlying a method for determining the curvature and/or torsion of the optical waveguide of a fiber-optic sensor.

DETAILED DESCRIPTION

Figure 1:
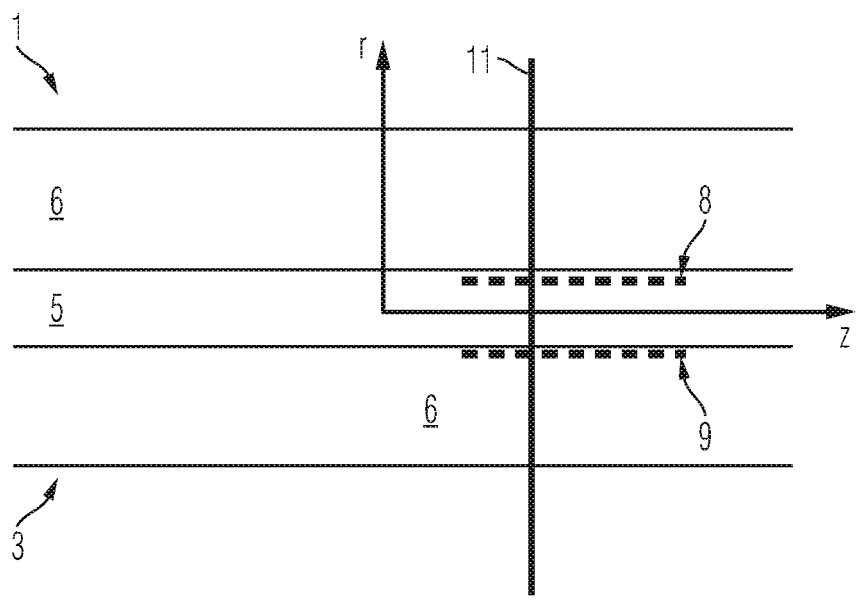
FIG. 1 shows a schematic diagram of a longitudinal section through a fiber-optic sensor.

Within single-mode as well as multi-mode optical waveguides, the light is guided in defined and mathematically describable light modes. The light modes describe the distribution of the electromagnetic field of the light (light field or mode field) within the optical waveguide. Optical waveguides are, for example, cores in glass fibers, laser-processed structures in glasses or also light-conducting structures in polymers. The light mode of a single-mode waveguide is characterized in that the light intensity, i.e. the intensity of the light field, is maximum in the center of the light field, i.e. in particular in the center of the fiber core, and is reduced to all sides similar to a Gaussian curve in the radial direction outwards. A superposition of many possible light modes within a multi-mode waveguide behaves in the same way.

When the optical waveguide is curved, the position of the maximum light intensity within the optical waveguide shifts in the opposite direction to the curvature. This process can also be described mathematically or simulated, i.e. calculated.

A Bragg grating is a region of periodic refractive index modulation in the material of the optical waveguide. The period of the refractive index modulation is also known as the grating constant and is of a magnitude in the range of the wavelength of the light to be conducted in the optical waveguide. This light is at least partially reflected by the Bragg grating, and the intensity of the reflected light depends in particular on its wavelength, the angle of incidence on the Bragg grating and the grating constant of the Bragg grating.

DE 10 2014 211 918 A1 discloses a fiber-optic sensor of the generic type, in which one of the Bragg gratings is inserted into a central core and further Bragg gratings are inserted into fiber cores in the cladding. The further fiber cores extend in the axial direction only over short partial regions of the optical waveguide and conduct light from the evanescence region of the light in the central core to the further Bragg gratings. Such an optical waveguide is complex to manufacture. The torsion of the optical waveguide can be determined by means of this sensor, and the measuring principle underlying the torsion determination is dependent on wavelength changes of the light in the optical waveguide, said changes occurring due to rotations or temperature changes of the grating structure of the optical waveguide. Accordingly, no simultaneous additional detection of a temperature-induced expansion of the optical waveguide can take place while the torsion is determined.

US 2007/0230861 A1 discloses an optical fiber, which has a core and a cladding as well as a plurality of different Bragg gratings, which are arranged at different positions in the optical fiber. However, this prior art does not describe that the curvature and/or torsion of an optical waveguide of a fiber-optic sensor is determined with it.

DE 10 2005 030 753 A1 describes an optical strain gage for the multi-axis strain measurement, which has at least two straight optical waveguide sections, each having one Bragg grating. This prior art does not disclose that an optical waveguide has at least two Bragg gratings. Furthermore, this citation does not describe that the strain gage is used to determine the curvature and/or torsion of an optical waveguide of a fiber optic sensor.

It is known to measure the curvature and/or torsion via a wavelength change of individual Bragg gratings. This causes a shift in the wavelength of a plurality of Bragg gratings available at various locations of the fiber core as soon as the fiber is bent. The amount of the wavelength change with a certain curvature depends linearly on the distance of the grating structure from the neutral axis of the fiber (i.e. typically the center of the fiber core). The wavelength change to be expected for a plurality of structures in a fiber core (with e.g. 4 μm diameter) is therefore more than one order of magnitude smaller than that of Bragg gratings in multicore fibers or waveguides in the cladding (with e.g. more than 60 μm diameter). A wavelength evaluation on the basis of the tiny signal change is hardly possible even in the case of large curvatures.

One object of the present invention is therefore to provide a method for determining the curvature and/or torsion of an optical waveguide of a fiber-optic sensor, which reduces the disadvantages of the prior art, in particular enabling a simplified, reliable and improved measurement of the curvature and/or torsion.

The method according to the invention serves to measure the light intensities in particular of three or four different Bragg gratings, which are located at one location, instead of the absolute wavelengths as in the prior art. In addition to a significantly higher measurement sensitivity, the method according to the invention can be used to additionally measure the wavelength as a sensory parameter in order to further determine the temperature and/or the expansion of the fiber via this wavelength measurement.

The intensity distribution of the guided light in waveguides can be clearly determined for all single-mode waveguides. This mode-field will shift at a curvature, as described in detail below. Since the Bragg gratings which differ from one another are located at fixed positions in the fiber core in the method according to the invention, the interactions between the mode field and the Bragg gratings change. The local curvature can be inferred from in particular three Bragg gratings, positioned at one location, irrespective of the wavelengths. By comparing the measured intensities, it is also possible to carry out the method according to the invention independently of sources of loss along the fibers.

A fiber-optic sensor used according to the invention has an optical waveguide which forms an axial direction oriented in one direction of light propagation and a radial direction oriented perpendicular thereto. The optical waveguide has a core for conducting light that runs centrally in the axial direction and extends at least substantially over the entire length of the optical waveguide, and a cladding (sheathing) which surrounds the core in the radial direction. "Extending substantially over the entire length" is understood to mean that, for example, one end of the optical waveguide can be provided with a termination region into which the core does not extend. There is at least one section of the optical waveguide running in the axial direction into which at least two Bragg gratings are inserted. The Bragg gratings are here radially spaced, i.e. arranged at different distances and/or in different directions to the axis of symmetry of the cross-section.

In some embodiments of the invention, the at least two Bragg gratings can be arranged in a common cross-sectional plane, situated in the radial direction, through the optical waveguide. In other words, the Bragg gratings overlap at least partially in the axial direction. This means that although they are spatially spaced in the radial direction, their length overlaps in a projection onto the central axial direction.

According to the invention, the Bragg gratings are inserted in the core and/or on the boundary between the core and the cladding and/or in an inner edge region of the cladding within an evanescence region (mode field edge) of the light. The evanescence region is the region outside the core in the cladding which the light that is guided through the core enters due to its wave property.

An optical sensor is provided in this way, by means of which a method for the amplitude evaluation of periodic index modulations for curvature and 3D shape detection of the optical fiber is made possible. The fiber-optic sensor used according to the invention is based on the possibility to process a plurality, i.e. at least two, in particular three or four, regions of a periodic refractive index modulation, i.e. Bragg gratings, also with distinguishable periods (grating constant) within the same sections of an optical waveguide. When manufacturing the sensor used according to the invention, a standard e.g. glass fiber with cladding as optical waveguide can be used as a basis. A local introduction of structures with periodic index modulation, i.e. Bragg gratings, into the edge region of the core of the waveguide is performed to locally disturb the mode field propagation of the light guided through the optical waveguide. In this way, a very cost-effective production of the sensor is possible. The Bragg gratings can be positioned both inside the fiber core and on the edge thereof as well as near the fiber core in the cladding, in the region of the evanescent field of the waveguide, e.g. by irradiation with focused laser light. If several regions with Bragg gratings are provided along the optical waveguide, the corresponding structures, i.e. a plurality of Bragg gratings overlapping in the axial direction, are inserted at different positions along the optical waveguide, e.g. an optical fiber.

The inner edge region of the cladding extends in the radial direction advantageously less than ten percent of the thickness of the cladding into the cladding. A sufficient intensity of the light from the core still enters this region in order to obtain a sufficiently strong reflection of the light by a Bragg grating positioned there, in order to be able to perform a good measurement of the intensity of the reflection after leaving the optical waveguide.

If three or four Bragg gratings running through the cross-sectional plane are arranged in the section, a curvature of the optical waveguide, e.g. of a fiber, can be determined even if there are intensity losses in the optical waveguide. The direction and amplitude of the fiber curvature can be determined from any geometric arrangement of at least three distributed grating structures, i.e. Bragg gratings. Two grating structures are already sufficient, provided that an additional total light intensity measurement is carried out or no intensity losses occur in the fiber.

If one of the Bragg gratings is arranged centrally in the core and two of the Bragg gratings are arranged in the inner edge region of the cladding, or if the three Bragg gratings are arranged in the inner edge region of the cladding, their positions can be determined particularly well by measuring the intensity of the light reflections produced by them in the case of a curvature of the light guide.

If four Bragg gratings running through the cross-sectional plane are arranged in the section, the four Bragg gratings all being arranged in the inner edge region of the cladding or all being arranged on the edge of the core or all being arranged in an outer edge region of the core, a redundancy of the position determination results, so that it can be determined more accurately while compensating for measurement inaccuracies.

It is advantageous to arrange the Bragg gratings in such a way that they are distributed symmetrically around the center of the core so that the locations in the optical waveguide, the position of which is determined, are evenly distributed within the optical waveguide.

If the Bragg gratings have a maximum diameter smaller than half the maximum diameter of the core, their position can be determined precisely. Usually, i.e. especially with an optical waveguide having a circular cross-section, the Bragg gratings have an elliptical basic shape. The large half-axis of the basic shape here runs in the axial direction of the optical waveguide perpendicular to the grating bars of the grating.

Very advantageously, at least some of the Bragg gratings have different grating constants. In this way, different wavelengths of light in the optical waveguide, i.e. their reflections by the Bragg gratings, can be evaluated well separately.

A fiber-optic sensor used according to the invention can be produced as follows: providing an optical waveguide which has an axial direction oriented in a light propagation direction and a radial direction oriented perpendicular thereto, the optical waveguide having a core running centrally in the axial direction and extending substantially over the entire length of the optical waveguide for conducting light and a cladding surrounding the core in the radial direction, and introducing at least two Bragg gratings extending through a common cross-sectional plane, situated in the radial direction, through the optical waveguide into a section of the optical waveguide extending in the axial direction by irradiation with laser light, in particular a femtosecond laser, by variation of the focal position of the laser light, wherein the Bragg gratings are introduced into the core and/or on the boundary between the core and the cladding and/or into an inner edge region of the cladding within an evanescence region of the light.

For example, the Bragg grating can be produced by modifying the material of the core by means of laser radiation. The laser radiation can be pulsed, for example with a pulse length of less than 10 ns, less than 1 ns or, in the case of a femtosecond laser, less than 100 fs. Furthermore, the Bragg grating can be created by doping the material of the core. In any case, the Bragg grating contains a plurality of spatially confined regions the refractive index of which is different from the refractive index of the surrounding material of the core. Thus, part of the light propagating in the core is reflected by the respective boundaries and part of it is transmitted. A plurality of such modified regions at a predeterminable distance form a Bragg grating which, depending on its grating constants, reflects a wavelength range of the incident light and transmits radiation of other wavelength ranges. When the temperature changes or mechanical stresses are applied, the Bragg grating is stretched or compressed so that the grating constant changes and can be determined by spectroscopic analysis of the transmitted or reflected light. The Bragg grating used according to the invention can be produced with an elliptical cross-section by laser material processing. Here, the laser radiation can be focused on the core by at least one cylindrical lens. Since the material modification by the laser radiation is limited to the focal point of the laser beam, an elliptical focus also results in a modified spatial region with the shape of a rotational ellipsoid. The femtosecond writing technique is preferably suitable for precisely positioning the index structures forming the Bragg gratings. The index structures are introduced into the optical waveguide using femtosecond laser pulses.

The method according to the invention for determining a curvature and/or torsion, e.g. caused by a temperature fluctuation, of the optical waveguide of a fiber-optic sensor according to the invention, comprises the following method steps: providing reference data of intensities of reflected light portions of light coupled into the optical waveguide depending on known reference deformations of the optical waveguide. The intensity data can be created e.g. by measurement and/or calculation. Measurement of at least one light intensity of reflected light portions of light coupled into the optical waveguide, the optical waveguide having a deformation to be determined, and determining the deformation by comparison of the light intensity with the reference data.

Thus, an evaluation of the light intensities reflected back from the structures forming the Bragg gratings is carried out. In contrast to the prior art approaches, the measuring principle according to the invention is independent of wavelength changes caused by expansions or temperature changes of the grating structures.

Therefore, in addition to the shape detection, an expansion or temperature detection can be carried out directly using known evaluation methods of Bragg grating reflections. The evaluation of a polarization dependence of the Bragg gratings for a torsion determination of the optical waveguide, e.g. according to DE 102014211918 A1, is also possible independently of a curvature and shape detection.

If at least two reflected light intensities are measured, a three-dimensional deformation can be determined by comparing the light intensities with the reference data.

When determining the curvature and/or torsion, it is advantageous to evaluate the light intensities using a spectrometer and/or AWG (arrayed waveguide grating) filter element and/or FBG (fiber Bragg grating) filter element.

In order to determine the curvature and/or torsion, wavelength multiplexing and/or time-resolved multiplexing of the light coupled into the optical waveguide can be performed, resulting in measurement signals, the errors of which can be minimized by statistical methods when determining the curvature and/or torsion. The reflected light intensities can also be evaluated by wavelength multiplexing and/or time-resolved multiplexing when determining the curvature and/or torsion.

Special embodiments of the present invention are explained in more detail below with reference to the enclosed drawings, wherein:

FIG. 1 shows a schematic diagram of a longitudinal section through a fiber-optic sensor, FIGS. 2a to f show a schematic diagram of different arrangements of Bragg gratings in a cross-section of a fiber-optic sensor, and FIGS. 3a and 3b show a diagram of the principle underlying the method according to the invention for determining the curvature and/or torsion of the optical waveguide of a fiber-optic sensor.

FIG. 1 shows a schematic diagram of a longitudinal section through an embodiment of a fiber-optic sensor 1. The longitudinal section runs in the axial direction z of the optical waveguide 3 of the sensor 1, which represents the light propagation direction of light in the core 5 of the optical waveguide 3, said core being made of a glass fiber, for example. The core 5 runs centrally in the axial direction and extends substantially over the entire length of the optical waveguide 3. In the radial direction r, i.e. perpendicular to the axial direction of the optical waveguide 3, a cladding 6, e.g. made of plastic material, surrounds the core 5 for the protection thereof. The axial direction and the radial direction are drawn in as r-z coordinate axes.

Two Bragg gratings (BG1 and BG2) 8, 9 are inserted in an optical waveguide section running in the axial direction. It is also possible to provide a plurality of such spaced-apart sections with Bragg gratings in the axial direction of the optical waveguide 3.

The spaced-apart Bragg gratings 8, 9 run through a common cross-sectional plane 11, situated in the radial direction, through the optical waveguide 3. The cross-sectional plane 11 is drawn in the figure as a vertical line because it runs perpendicular to the drawing plane. Since the Bragg gratings 8, 9 have the same diameter, they overlap completely in the axial direction. One of the Bragg gratings 8 is inserted in the core 5 in an outer edge region of the core 5. The other Bragg grating 9 is inserted in an inner edge region of the cladding 6 within the evanescence region of the light that is guided in the core 5 when the sensor 1 is used. The grating bars of the Bragg gratings 8, 9 extend perpendicular to the axial direction. The grating rods do not have to have any significant longitudinal expansion. They can also be substantially dot-shaped. They are then lined up, as shown, one behind the other on a line parallel to the axial direction.

In contrast to known overlaid Bragg gratings which are referred to as superimposed, the structures of periodic refractive index modulation, which are introduced into the optical waveguide 3 of a fiber-optic sensor 1 according to the invention as Bragg gratings 8, 9, are different as regards their relative position to the center of the fiber core 5 and have a significantly smaller cross-section (point diameter), i.e. maximum diameter, than the diameter of the core 5. The structures can here be located both in the fiber core 5 and in particular at the edge or in the adjacent surrounding material of the cladding (cladding material) 6 in the region of the evanescent interaction of the light, i.e. in the evanescence region, in the optical waveguide 3. The figure shows an example of the position of the periodic index modulation, i.e. the Bragg gratings 8, 9, in the edge regions of the fiber core 5 and in the cladding material 6.

FIGS. 2a to 2f show a schematic diagram of various arrangements of Bragg gratings in each case in one cross-sectional plane through a section of the optical waveguide 3 of a fiber-optic sensor according to the invention. The cross-sectional planes coincide with the drawing plane, which is why they are represented only by the circular circumference of the optical waveguide 3. They show examples of possible geometric arrangements of periodic index structures, i.e. Bragg gratings 20, in particular at the edge of the mode field for a good 3D shape determination of the optical waveguide 3, i.e. the deformation thereof. The cross-sectional planes are all located in the radial direction of the optical waveguide 3, i.e. their surface normals run in the direction of the axial direction of the optical waveguide 3. The Bragg gratings 20, symbolically represented as dots, all run through the cross-sectional plane of the associated optical waveguide 3, which means they are located on the cross-sectional planes. The Bragg gratings 20 have a maximum diameter which is smaller than half the maximum diameter of the core 5.

Figure 2A:
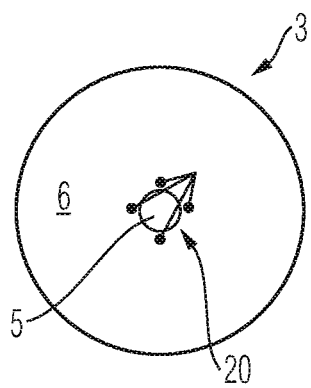
FIGS. 2a to 2f show a schematic diagram of various arrangements of Bragg gratings in a cross-section of a fiber-optic sensor.
Figure 2B:
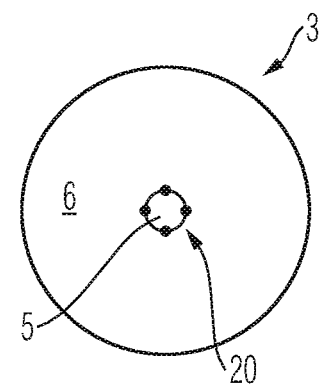
Figure 2C:
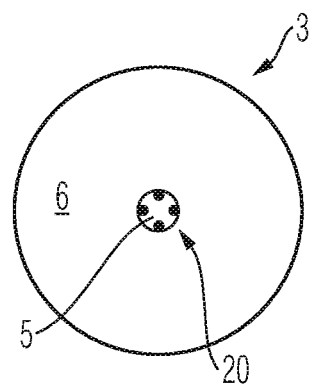
Figure 2D:
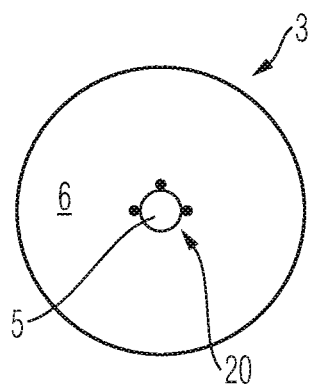
Figure 2E:
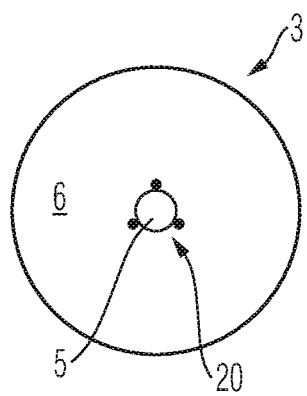
Figure 2F:
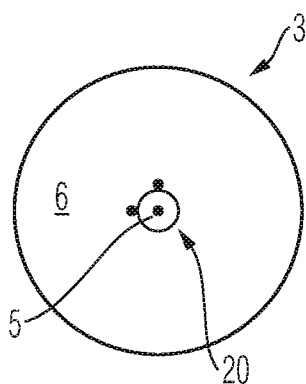

In FIGS. 2d to 2f, three Bragg gratings 20 running through the cross-sectional plane are arranged in the respective section. In FIGS. 2d and 2e, the three Bragg gratings 20 are arranged in the inner edge region of the cladding 6. In FIG. 2e, they are distributed symmetrically around the center of the core 5. In FIG. 2f, one of the Bragg gratings 20 is arranged centrally in the core 5 and two of the Bragg gratings 20 are arranged in the inner edge region of the cladding 6.

In FIGS. 2a to 2c, four Bragg gratings 20 running through the cross-sectional plane are arranged in the respective section. In FIG. 2a, the four Bragg gratings 20 are all arranged in the inner edge region of the cladding 6. In FIG. 2b, all Bragg gratings 20 are arranged on the edge of the core 5, whereas in FIG. 2c all Bragg gratings 20 are arranged in an outer edge region of the core 5. The four Bragg gratings 20 are arranged symmetrically around the center of core 5.

FIGS. 3a and 3b show the principle underlying the method according to the invention for determining a deformation, i.e. a curvature and/or torsion, of the optical waveguide 3 of a fiber-optic sensor. FIG. 3a illustrates an optical waveguide 3 of a fiber-optic sensor with two Bragg gratings 8, 9 without deformation, i.e. straight. In FIG. 3b, this waveguide is curved. In the optical waveguide 3, the intensity distribution I (mode field intensity distribution) of the light introduced for determining the deformation is shown in each case in the form of its spatial mode field distribution. The intensity distribution corresponds to a Gaussian distribution 30, which is drawn in a tilted x-y coordinate system. In the optical waveguide 3 without deformation, the Gaussian distribution 30 is evenly distributed around the center of the core 5, whereas in the curved waveguide the Gaussian distribution 30 is shifted in the radial direction, thus extending further into the cladding 6 of the optical waveguide.

The lower parts of the figures show the light intensities 35 (intensity signal) after interaction of a spectrally broadband light field with a Bragg grating formed as periodic index modulation at the edge of the mode field, i.e. the intensity of a reflected spectrum each. It can be seen how the intensity signal 35 changes when the optical waveguide 3 is bent as illustrated. For a structure with periodic index modulation, i.e. a Bragg grating, at a certain location relative to the center of the core of an optical waveguide (fiber core center), the intensity (I) of the back reflected light changes when it interacts with the structure when the mode field is shifted. This leads to a change in the light intensity reflected by the Bragg grating, which can be detected or becomes a deformation measurement. It can be seen that the intensity of the reflected light 35 of the individual Bragg gratings 8, 9 has changed due to the curvature. In particular, the intensity associated with the upper Bragg grating (BG1) 8 in the figure has increased and the intensity associated with the lower Bragg grating (BG2) 9 in the figure has decreased.

The displacement of the mode field and, resulting therefrom, the local curvature of the fiber can be calculated from a plurality of intensity signals 35 from the same position of the waveguide. An interpolation of many such measuring points allows a complete reconstruction of the three-dimensional shape of the fiber and thus of the optical waveguide in space. Corresponding effects also occur with the torsion and expansion of the optical waveguide and are evaluated for the determination thereof.

On the basis of the illustrated intensity shifts of the light reflected by the Bragg gratings, the method according to the invention for determining the curvature and/or torsion of the optical waveguide of a fiber-optic sensor comprises the following method steps: providing reference data (calibration parameters) of intensities of reflected light portions (amplitude signals) of light coupled into the optical waveguide, in particular depending on known reference deformations of the optical waveguide, measuring at least one light intensity of reflected light portions of light coupled into the optical waveguide, the optical waveguide having a deformation to be determined, and determining the deformation, i.e. evaluating the light intensities of the reflected light portions, by comparing the light intensity with the reference data. The reference data can be calculated e.g. by simulation or also measured. The reflected light portions, i.e. their light intensities, are particularly well evaluable for determining the deformation if the Bragg gratings are inserted into the optical waveguide in a geometric arrangement according to FIG. 2.

A possible evaluation of amplitude signals of the fiber-optic sensor is based on the comparison of the respectively current amplitude ratios of all sensors involved in a measuring plane, i.e. Bragg gratings, with the calibration parameters that correspond to the amplitude ratios of the non-curved sensor.

The determination of the amplitude signals, i.e. the height thereof, can be realized via all known evaluation methods of ordinary spectrometer-based FBG Bragg gratings, e.g. ordinary spectrometer-based FBG evaluation units, arrayed waveguide-grating (AWG) systems, tunable laser diodes, runtime-selective interrogators in the frequency or time domain, or also with further Bragg gratings. It can be carried out by measuring an absolute value or by a mathematical function adaptation to the raw data signal.

Every possible ratio of Bragg gratings of a measuring plane, i.e. Bragg gratings on a cross-sectional plane of the optical waveguide, can be assigned exactly to a shift of the associated mode field. Fiber-optic sensors with four orthogonal gratings, as shown in FIGS. 2d to f, can be used to directly determine in this way the curvature of the optical waveguide in both spatial directions separately from one another.

More generally, on the assumption of the mathematical mode field description of a non-curved waveguide for three gratings positioned in any two-dimensional arrangement, a clear shift can be determined by geometrical and numerical methods, which corresponds to the actually measured relative intensities of the three gratings. Instead of a static model for the intensity distribution of the light in the fiber core, it is also possible to store simulated, i.e. calculated, mode fields as reference data for different curvatures, which show a certain distortion of the intensity distribution depending on the radius of the curvature. In combination with numerical solution methods, this promises the greatest possible accuracy in the conversion of measured signal amplitudes into the deformation, e.g. curvature, to be determined.

The method according to the invention is described by way of example below on the basis of 3 or 4 superimposed FBGs at different positions of the fiber core, aligned here at right angles to each other, in order to determine a curvature:

(In the following description, the Z-axis is the direction of propagation of the light, the X- and Y-axes are therefore the top view of the cross-section of the fiber)

1. The intensity distribution of the mode field for the given glass fiber parameters (core diameter, refractive index, numerical aperture of the fiber) can be approximated by a normal distribution. This can also be done by any more precise mathematical model.

2. Due to the sensor production, the relative positions of the employed Bragg gratings to one another and to the fiber core center are known (typically at the edge of the fiber core, for example 2.2 μm away from the center). For the sake of simplicity, two Bragg gratings are considered below at opposite positions to the fiber core on the X-axis and the further Bragg grating or gratings perpendicular thereto directly on the Y-axis.

(Coordinates: Bragg grating 1: (2.2 μm, 0 μm), Bragg grating 2: (−2.2 μm, 0 μm), Bragg grating 3: (0 μm, 2.2 μm) and Bragg grating 4: (0 μm, −2.2 μm))

3. The measured (and process-related differing) amplitudes of all gratings are normalized to the intensity of a non-curved fiber, which has the perfectly centered mode field at its spatial position. This normalization represents a calibration constant.

4. The intensity ratio between the first two Bragg gratings corresponds to a fiber which is not curved (along the X-axis). When the fiber is bent, the intensity ratio between the two opposite Bragg gratings changes.

5. it can be determined how far the mode field must have shifted in the X-direction in order to arrive at the new amplitude ratio.

For an evaluation of 4 Bragg gratings at each measuring point:

6. If there are also 2 Bragg gratings opposite on the Y axis, this method can also be carried out directly for the Y axis.

For an evaluation of 3 Bragg gratings at each measuring point (advantageous due to the smaller number of Bragg gratings required):

7. The intensity to be expected at position X=0 (i.e. on the Y-axis) is derived for the shifted mode field determined in point 5 along the X-axis. This intensity is used as a virtual fourth grating amplitude, so to speak.

8. The shift of the mode field can also be determined on the Y axis between the third Bragg grating and the new virtual Bragg grating analogous to above points 4 and 5.

This can be used to determine both the direction and the strength of the mode field shift.

The direction of curvature and the radius of the curvature of the glass fiber are obtained directly via a suitable conversion model (in the simplest case an inversely proportional dependency).

A plurality of such curvature measurement planes along a glass fiber allow the complete 3D shape reconstruction.

It is advantageous if the following is used in the method according to the invention:

the inscription of at least 3 Bragg gratings at different relative positions to a single-mode waveguide, an evaluation system which can evaluate and distinguish intensities of at least 3 Bragg gratings of different wavelengths, an algorithm (as the one described above) for determining the shift of the mode field from at least 3 relative intensities of the Bragg gratings, and possibly the determination of the normalization constant, which corrects the random and production-related amplitude ratio of the Bragg gratings to the intensities of the mode field at the respective spatial position of the Bragg gratings for a non-curved fiber.

It goes without saying that the invention is not limited to the described embodiments. Therefore, the above description should not be considered limiting but explanatory. The following claims should be understood in such a way that a stated feature is present in at least one embodiment of the invention. This does not exclude the presence of further features. If the claims and the above description define "first" and "second" embodiments, this designation serves to distinguish between two similar embodiments without determining a ranking order.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A method for determining a curvature and/or torsion of an optical waveguide of a fiber-optic sensor comprising an optical waveguide having an axial direction oriented in a light propagation direction and a radial direction oriented perpendicular thereto, wherein the optical waveguide has a core, which extends centrally in the axial direction and runs at least substantially over the entire length of the optical waveguide, for conducting light, and a cladding, which surrounds the core in the radial direction, and wherein a section of the optical waveguide extends in the axial direction and has a plurality of Bragg gratings including a first Bragg grating and a second Bragg grating, which are introduced therein and extend through a common cross-sectional plane, situated in the radial direction, through the optical waveguide, wherein the Bragg gratings are inserted in the core and/or on a boundary between the core and the cladding and/or in an inner edge region of the cladding within an evanescence region of the light, the method comprising:

providing reference data of intensities of reflected light portions of light coupled into the optical waveguide, measuring a light intensity of a reflected portion of light coupled into the optical waveguide, the optical waveguide having a deformation to be determined, and determining the deformation by comparing the light intensity with the reference data, the first Bragg grating having a different grating constant than the second Bragg grating, wherein wavelength multiplexing and/ or time-resolved multiplexing of the light coupled into the optical waveguide is carried out in order to determine the deformation.

2. The method of claim 1, wherein the inner edge region of the cladding extends in the radial direction less than ten percent of the thickness of the cladding into the cladding.

3. The method of claim 1, wherein the Bragg gratings include three Bragg gratings extending through the common cross-sectional plane, the three Bragg gratings arranged in the section.

4. The method of claim 3, wherein one of the three Bragg gratings is arranged centrally in the core and two of the three Bragg gratings are arranged in the inner edge region of the cladding.

5. The method of claim 3, wherein the three Bragg gratings are arranged in the inner edge region of the cladding.

6. The method of claim 1, wherein the Bragg gratings include four Bragg gratings extending through the common cross-sectional plane, which are arranged in the section.

7. The method of claim 6, wherein the four Bragg gratings are all arranged in the inner edge region of the cladding or are all arranged on an edge of the core or are all arranged in an outer edge region of the core.

8. The method of claim 1, wherein the Bragg gratings are arranged in such a way that the Bragg gratings are symmetrically distributed around the center of the core.

9. The method of claim 1, wherein the Bragg gratings have a maximum diameter less than half the maximum diameter of the core.

10. The method of claim 1, wherein measuring the light intensity includes measuring a plurality of light intensities, and wherein determining the deformation includes determining a three-dimensional deformation by comparing the light intensities with the reference data.

11. The method of claim 1, wherein measuring the light intensity includes measuring a plurality of light intensities, and wherein the light intensities are evaluated by a spectrometer, an AWG filter element, and/or a FGB filter element when determining the deformation.

12. The method of claim 1, wherein the reference data of intensities of reflected light portions of light coupled into the optical waveguide guide are provided depending on known reference deformations of the optical waveguide.

13. The method of claim 1, wherein measuring the light intensity includes measuring a plurality of light intensities and, when determining the deformation, an evaluation of the light intensities is carried out by wavelength multiplexing and/or time-resolved multiplexing.

* * * * *